June 3, 1969
H. STACKEGÄRD
3,448,285
POWER TRANSMISSION PLANT FOR HIGH VOLTAGE DIRECT CURRENT
COMPRISING AT LEAST THREE CONVERTER STATIONS WITH
SWITCHING MEANS THEREBETWEEN
Filed June 14, 1967
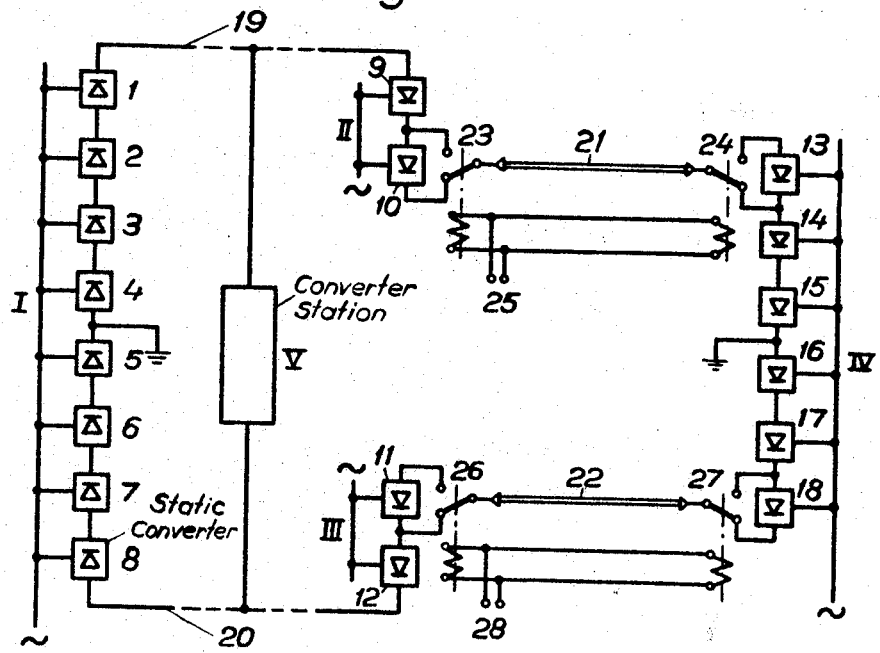
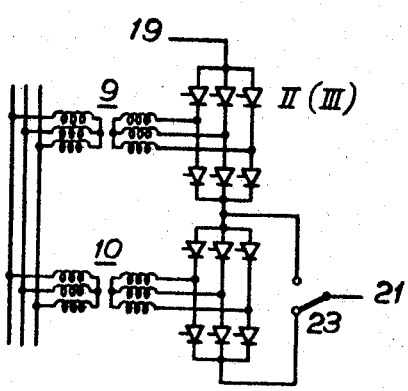
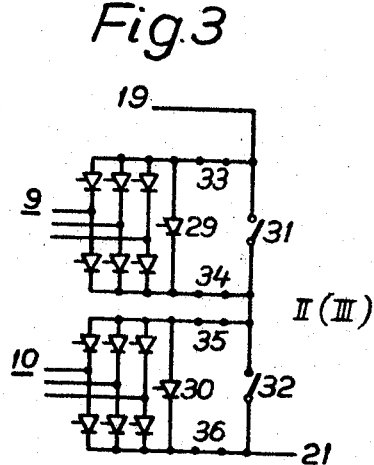
INVENTOR.
HANS STACKEGÄRD
BY
Bailey, Stephens + Huettig United States Patent Office 3,448,285
Patented June 3, 1969

3,448,285
POWER TRANSMISSION PLANT FOR HIGH VOLTAGE DIRECT CURRENT COMPRISING AT LEAST THREE CONVERTER STATIONS WITH SWITCHING MEANS THEREBETWEEN
Hans Stackegärd, Ludvika, Sweden, assignor to Allmänna Svenska Elektriska Aktiebolaget, Vasteras, Sweden, a corporation of Sweden
Filed June 14, 1967, Ser. No. 646,018
Claims priority, application Sweden, June 15, 1966, 8,140/66
Int. Cl. H02j 3/38
U.S. Cl. 307—18                                        5 Claims

ABSTRACT OF THE DISCLOSURE

A power transmisson plant for high voltage direct current comprises at least three converter stations, two of which are connected in series. Said two stations comprise each a number of series-connected converters and switching means for connection and disconnection of some of the converters in the stations and said switching means of the two stations are connected together so upon their operation the number of series-connected converters in the two stations together remains unchanged.

Background of the invention

*Field of the invention.*—The present invention relates to a power transmission plant for high voltage direct current comprising at least three converter stations, two of which are connected in series, each of these two comprising a number of series-connected converters.

*The prior art.*—For direct current power transmission between more than two stations, there is a choice between series-connecting and parallel-connecting the various stations. Usually for technical reasons parallel-connection is considered the most practical, while series-connection may be used for special cases.

Summary of the invention

The present invention relates more closely to a combination of the two principles whereby at least two stations are connected together in series, whereas these two stations together and all other stations are connected in parallel between two DC conductors.

A transmission plant according to the invention is characterized in that in said two series-connected stations are connection means for connecting and disconnecting at least some of the converters, these connection means in the two stations being connected together so that upon switching the number of series-connected converters in the two stations together will remain unchanged.

The invention will be most useful where one or more rectifier stations are arranged to feed through a rather long transmission line two inverter stations situated rather close to each other. According to the parallel-connection principle, each inverter station must in this case be provided with as many series-connected converters as that or those feeding rectifier stations, whereas according to the invention the total number of series-connected converters in both the inverter stations is equal to the number of series-connected converters in the rectifier station. To this must be added one or a few extra converters in each inverter station for connection and disconnection when the power distribution is altered between the two stations, for example due to fluctuations during the 24-hour period.

Such a fluctuating power distribution may, for example arise in a town area with a large industrial area on the outskirts. According to the invention it is possible to place the first inverter station on the outskirts of the town, the station thus forming the end-station for a long overhead line. From this first inverter station a DC cable with limited voltage goes to the second station which is placed within the town. Two rectifier stations could also be series-connected in this way to obtain mutually adjustable power ratios.

Brief description of the drawings

The invention will be further described with reference to the accompanying drawing where FIGURE 1 shows a direct current power transmission plant according to the invention, while FIGURES 2 and 3 show in more detail variations of stations according to the invention.

Description of the preferred embodiments

FIGURE 1 shows a DC power transmission plant comprising four stations, namely one feeding rectifier station I and three inverter stations II, III and IV. A further station V may be connected in parallel with the others between the DC conductors 19 and 20. The stations II, III, IV are connected in series by means of DC cables 21, 22 and are in parallel with the other station(s) I, V connected to the DC conductors 19 and 20.

The rectifier station I comprises eight converters 1–8 connected in parallel to a feeding AC network and in series to the DC conductors 19 and 20, which may for example consist of overhead lines. The DC side of the station is also provided with an earthed centre-tap. The overhead lines 19 and 20 are connected to the inverter stations II, III where part of the power is taken out and fed into the AC networks connected to these stations. From the stations II, III DC cables 21, 22 are connected to a third inverter station IV comprising six series-connected converters 13–18 which are connected on the AC side to a receiving AC network. This station is also provided on the DC side with an earthed center tap. Each of the stations II and III is provided with two series-connected converters 9, 10 and 11, 12, respectively. The DC cables 21 and 22 are connected to the corresponding stations with the help of two-way switch-contacts 23, 24 and 26, 27, respectively. The switch-contacts belonging to a DC cable are controlled by means of a relay system having common control inputs 25 and 28, respectively. In this way the connection of a converter in a station at one end of a cable will cause disconnection of a corresponding converter in the station series-connected to it at the other end of the cable and the total number of series-connected converters in the three series-connected stations II, III and IV will be independent of change-overs in the different stations. Thus a distribution of the DC power is obtained over several stations situated at different points without these stations being individually equipped with a complete set of converters as would have been the case with a parallel-connection of the stations.

Another advantage is that the voltage through the DC cables is limited in relation to the voltage through the overhead lines, which also involves a saving. By choosing the number of converters in the various inverter stations, it is also easy to vary the power distribution between the different stations. Depending on the geographical position of the consumption areas, stations II and III may be made as two separate stations or may be built together as one station connected to one and the same AC network. In the latter case the arrangement shown provides the power distribution possibilities 1–1, 3–5 and 1–3. With the switch-contact in the position shown the power distribution will be 3–5.

FIGURES 2 and 3 show different detail embodiments of the stations II and III. Each of the converters 9, 10 in station comprises a converter transformer connected to a rectifier station which in turn may be built up of mercury arc rectifiers or, as shown, with thyristor rectifiers. At the ends of the converter 10 are arranged terminals connected to individual contact parts in the switch-contact 23 which is connected to the DC cable 21. By switching over this switch-contact the converter 10 can be connected and disconnected. Simultaneously with the switch-contact 23 the switch-contact 24 in station IV of FIGURE 1 is influenced, so that connection of a converter in one station incurs disconnection of a corresponding converter in the other station.

Instead of the switch-contacts, as shown in FIGURES 1 and 2, connection and disconnection of the converters and disconnection of the converters may be effected with the help of a by-pass means in the form of isolators 31, 32, as shown in FIGURE 3. Each rectifier connection is here provided with a by-pass valve 29 and 30, respectively, short-circuiting means 31, 32, respectively, and disconnection means 33–36. The connection means 31-36 are suitably made as power isolators such as those normally used in the converter field. When one of the converters 9 or 10 is by-pass connected, in FIGURE 3, a corresponding converter must at the same time be connected in the station IV in FIGURE 1. The cooperation between the various by-pass means in the different station may be a little more complicated than between the switch-contacts shown in FIGURES 1 and 2. On the other hand, it is usual to provide the various converters with by-pass connection means according to FIGURE 3 so the solution in FIGURE 3 means that the switch-contacts according to FIGURES 1 and 2 can be avoided. Simultaneously the use of by-pass connection means according to FIGURE 3 means that any one of the converters in the various stations may be connected or disconnected, which may also be an advantage.

The connections shown in the drawings should be considered only as examples and it is clear that the invention provides considerable freedom of choice of converter-arrangement in the different stations. It is also possible with the help of converters of standard type to build up a DC transmission plant in exact agreement with the demands for power distribution between different stations set in a particular case. Similarly it is clear that apart from the switching possibilities evolved by the invention, it must be possible to connect and disconnect converters in the event of a fault.

I claim:

1. Power transmission plant for high voltage direct current comprising at least three converter stations, two of which are connected in series, each of these two comprising a number of series-connected converters, characterised in that the transmission plant comprises switching means for connection and disconnection of at least one of the converters in each of said two series-connected stations, which switching means in the two stations are connected together so that upon operation thereof the number of series-connected converters in the two stations together will remain unchanged.

2. Power transmission plant according to claim 1, characterised in that said two series connected converter stations are inverter stations for supplying two areas of consumption, the distance from each other being small in relation to the distance to a feeding rectifier station.

3. Power transmission plant according to claim 2, characterised in that said transmission plant comprises an overhead line between the rectifier station and a first inverter station while the two inverter stations are connected by a DC cable.

4. Power transmission plant according to claim 1, characterised in that said switching means are connected to taps between the converters in the two series-connected stations.

5. Power transmission plant according to claim 1, characterised in that the switching means consist of by-pass connection means for converters.

References Cited

UNITED STATES PATENTS 3,280,334   10/1966   Uhlmann et al. _____ 307—85 X

ROBERT K. SCHAEFER, *Primary Examiner.*

H. J. HOHAUSER, *Assistant Examiner.*

U.S. Cl. X.R.

307—85; 321—2